United States Patent Office 3,080,716
Patented Mar. 12, 1963

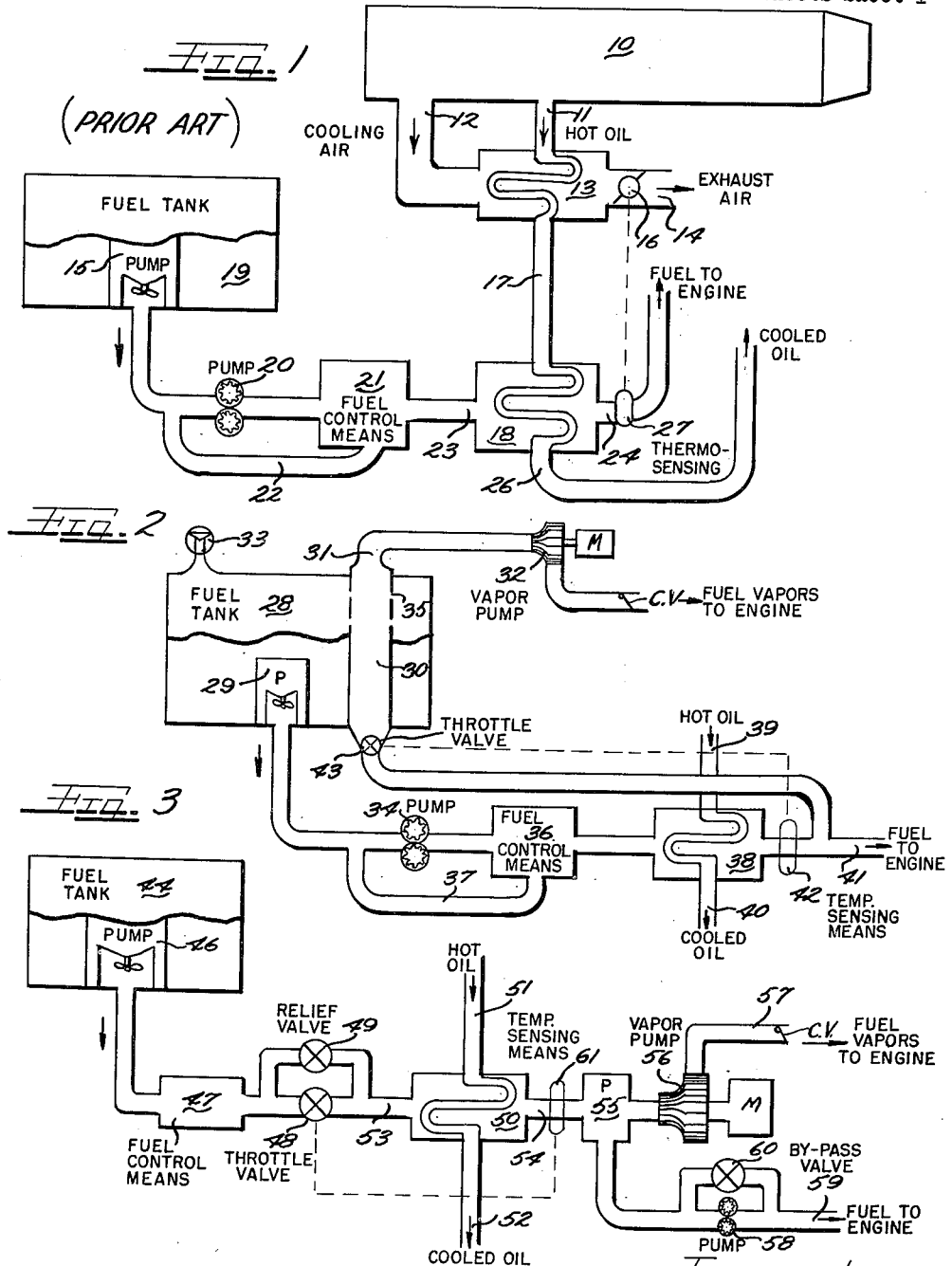

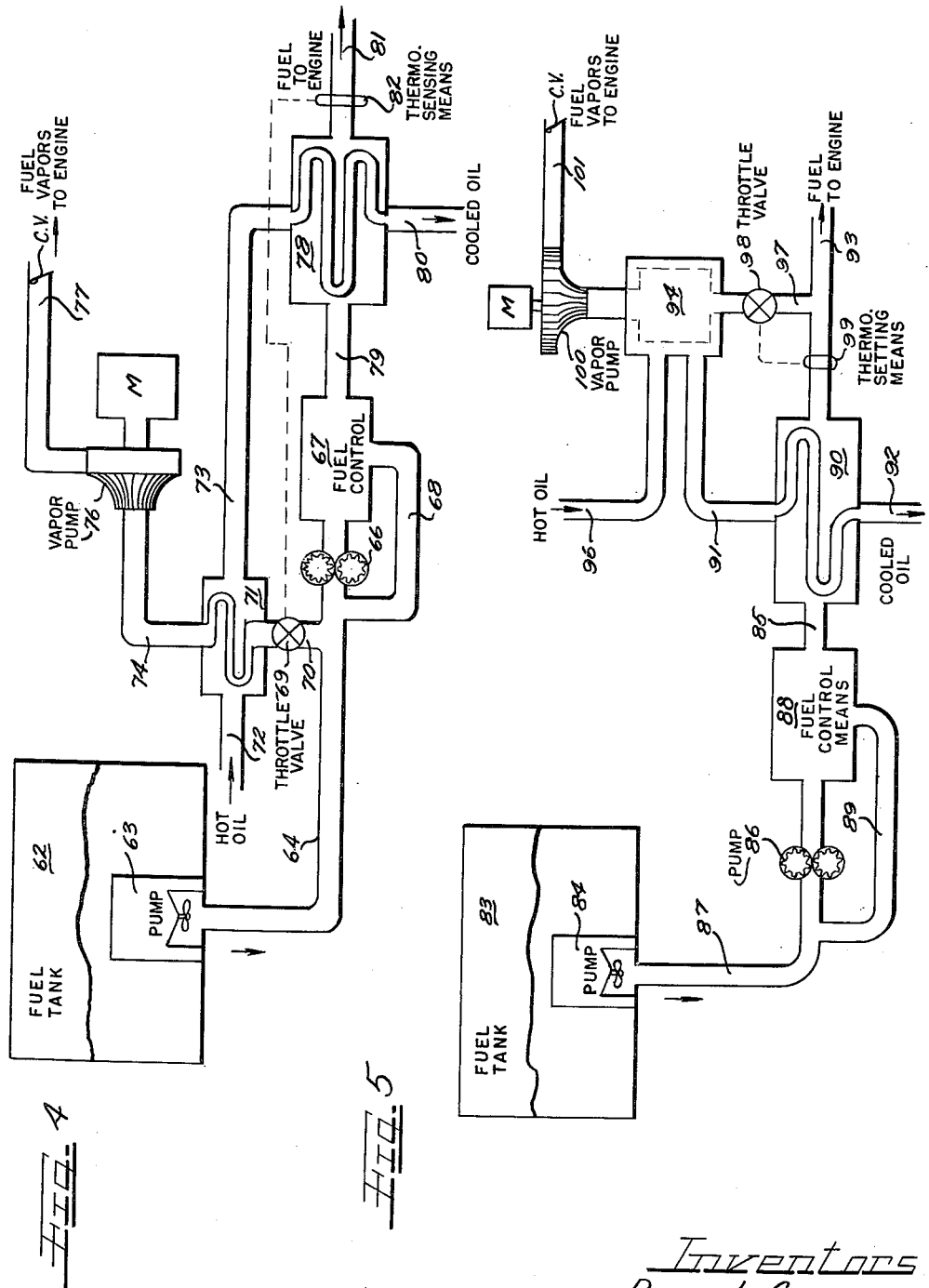

3,080,716
ENGINE LUBRICATING OIL COOLING SYSTEMS FOR TURBOJETS OR THE LIKE
Robert L. Cummings, Berea, and George M. Lance, Euclid, Ohio, assignors to Thompson Ramo Wooldridge, Inc., a corporation of Ohio
Filed Mar. 8, 1956, Ser. No. 570,403
19 Claims. (Cl. 60—39.66)

This invention relates generally to lubricating oil cooling systems for engines for aircraft, especially turbojet engines. More specifically, this invention relates to such an oil cooling system in which the cooling effects accompanying the vaporization of a volatile fuel or liquid are utilized as a supplementary cooling means to extend the performance or the operating range of a conventional oil to fuel heat exchanger.

Heretofore, aviation turbojet engines included oil to air, or oil to fuel, heat exchanger systems of various types for maintaining the lubricating oil within an operating temperature range. In each of these systems, hot lubricating oil is pumped through some form of heat transfer device in which either air at atmospheric temperature or fuel from the fuel tanks is used as the cooling medium.

The oil to air heat exchanger may be designed to adequately cool the lubricating oil of a turbojet engine at all altitudes but this usually requires excessively large radiator area due to the high heat rejection rate of current turbojet engines and the reduction in cooling ability of the atmosphere with increasing altitude.

The oil to fuel heat exchanger has a similar top limit cooling range in that the final fuel temperature or the fuel from the heat exchanger entering the fuel nozzles of the engine must be maintained below a predetermined maximum, which, for example, may be 225° F. for certain types of jet fuel, in order to avoid fuel nozzle clogging. The cool tank fuel or sensible type of heat exchanger system is subject to the additional limitation of an increasingly smaller fuel flow rate as the aircraft climbs to higher altitudes, due to the lower fuel consumption of a turbojet engine at high altitudes.

While the use of continuously acting fuel vaporization as the sole oil cooling means and in the multiple discharge conduits to the fuel burners has been proposed heretofore for use in such engine oil cooler systems, such types have been objectionable for various reasons including complexity.

It will thus be appreciated that the conventional oil to air heat exchanger, in oil to fuel heat exchanger, and other types have not been entirely satisfactory, either from a functional, aerodynamic, weight or efficiency standpoint.

The present invention offers a solution to the problem in the form of an improved type of oil to fuel heat exchanger system in which part of the fuel is vaporized at some point in the cooling cycle to obtain the additional heat removing effects associated with the vaporization of volatile liquid fuels in general and such as jet aircraft fuels in particular.

Briefly described, the present invention contemplates some form of thermostatic control device positioned downstream of an oil to fuel heat exchanger along the fuel conduit connected to the fuel nozzles. When the oil temperature entering the oil to fuel heat exchanger becomes sufficiently high or the fuel flow rate becomes sufficiently low to raise the temperature of the fuel discharging from the hot side of the fuel heat exchanger to a safe temperature for the fuel and such as approximately 225° F. as an example herein and which has been found to be a safe upper limit for certain fuels to avoid clogging in the fuel nozzles, the thermostatic control device will activate a throttle or pressure reduction causing valve along the cooling cycle system to help to partially vaporize the fuel to remove heat therefrom and thereby obtain an additional cooling effect for the oil by heat transfer to said fuel. This throttle or pressure reduction causing valve is in addition to, and substantially independent in its action from, the main engine fuel control.

It will be appreciated that this throttling valve may be placed at the most advantageous point along the system, or that multiple units may be incorporated where greater cooling is required, depending upon the particular installation and operating conditions.

In addition, a separate fuel vaporizing system may be incorporated with the main oil to fuel heat exchanger to operate with the latter unit, or in a stand-by arrangement to be selectively activated by some thermo-sensing device whenever the sensible cooling through the fuel oil heat exchanger becomes insufficient to maintain the temperature of the discharge fuel below the 225° F. limit.

It is then a broad object of the present invention to provide an improved type of oil cooling system for fluid volatile liquid fuel consuming engines.

Another object of the present invention is to provide an improved type of engine oil cooling system where excessive lubricating oil temperatures will occur unless some extra form of cooling is incorporated in the system.

A further object of the invention is to provide an improved type of fuel-oil heat evhanger for use in an oil cooling system in which part of the fuel is selectively vaporized to obtain additional cooling effects under thermostatic control from the oil temperature.

Another object of the present invention is to provide an improved type of oil to fuel heat exchanger for use in turbojet or other engines, in which a sensible cooling system is supplemented by the selected vaporization of some of the fuel passing through the cooling system to obtain an addition oil cooling effect only when needed.

A still further object of the present invention is to provide an oil cooling system for a turbojet or other type of engine in which no external air intake or exhaust ducts are required.

Yet another object of the present invention is to provide a more compact and simple oil cooling system for a turbojet or other engine, in which the size and weight will be greatly reduced as contrasted to conventional oil cooling systems.

Many other objects and advantages of the present invention will be apparent to those skilled in the art from the following detailed description of the annexed sheets of drawings which, by way of preferred example only, illustrate four specific embodiments of the present invention and compare these embodiments with the prior art.

On the drawings:

FIGURE 1 is a schematic view of a typical prior art turbojet oil cooling system using a combination air-oil heat exchanger and fuel-oil heat exchanger.

FIGURE 2 is a schematic view of a fuel tank vaporization cooling system embodying the present invention.

FIGURE 3 is a schematic view of an oil cooling system using a throttled fuel heat exchanger and vapor separator pump according to the present invention.

FIGURE 4 is a schematic view of an oil cooling system in which a separate bypass boiling cooler is used in conjunction with a fuel-oil heat exchanger according to the present invention.

FIGURE 5 is a schematic view of an oil cooling system using a separate bypassing boiling cooler in conjunction with a conventional fuel-oil heat exchanger according to the present invention.

As shown on the drawings:

In the prior art oil cooling system shown in FIGURE 1, a jet engine 10 has a hot oil delivery source 11, and a cool air source 12 near the inlet of the engine, communicating with an air-oil heat exchanger 13. A downstream exhaust duct 14 encloses a throttle valve 16 which regulates the air flow through the air-oil heat exchanger 13.

The air-oil heat exchanger 13 receives hot oil from the hot oil outlet 11 of the engine 10 and discharges the cool oil through a communicating conduit 17 to the oil inlet of a fuel-oil heat exchanger 18.

The fuel-oil heat exchanger 18 receives cool fuel from an upstream fuel tank 19 in which a booster pump 15 serves as a vapor removal and fuel transfer means. A main fuel pump 20 and flow control means 21 maintain a regulated fuel flow to the fuel-oil heat exchanger 18 in response to engine requirements. Suitable bypass means 22 allow recirculation in the event that the engine fuel consumption rate is less than the delivery rate of the pump 20.

A cool fuel inlet 23 in the fuel-oil heat exchanger 18 feeds the cool fuel through the fuel-oil heat exchanger 18 in heat exchange relation with the oil and a hot fuel discharge outlet 24 feeds the heated fuel to the fuel nozzles (not shown) in the engine 10.

The cooled oil leaves the fuel-oil heat exchanger 18 by a conduit 26 where it is returned to the engine 10 to cool and lubricate the various engine components.

A thermostatic sensing device 27, in the hot fuel discharge conduit 24 controls a throttle valve 16 in the air-oil heat exchanger 16 to regulate the rate of air flow through the heat exchanger 13 in acordance with the temperature of the fuel being fed to the engine nozzles.

Thus, it will be appreciated that the prior known art includes a combination air-oil heat exchanger in series with a fuel-oil heat exchanger and has the attendant disadvantages of increased weight, bulk and drag, which are inevitably present with an air-oil heat exchanger.

It will also be appreciated that any oil cooling system which would eliminate the air-oil cooler and still maintain adequate cooling for the hot lubricating engine oil, would result in a substantial increase in overall aerodynamic efficiency of the aircraft by the removal of the large cooling ducts necessary for high altitude operation.

FIGURE 2 represents one embodiment of the present invention which completely eliminates the air-oil cooler from the oil cooling system.

In FIGURE 2, a fuel tank 28 containing fuel, acts as a heat sink for hot engine lubricating oil and, as shown, encloses a booster pump 29, and a standpipe 30. A fuel vapor takeoff 31 communicates with a motor driven vapor pump 32 to draw vapors through the standpipe and feed them either in vapor of condensed form to the combustion chambers of the engine 10. If desired, the pump 32 could feed condensed vapors back to the main liquid fuel line feed to the engine. A check valve C.V. is provided between the pump 32 and the combustion chambers of the engine 10 to prevent back flow of combustion gases. A relief valve 33 prevents any excessive pressure accumulation in the fuel tank 28, not removed by the vapor pump 32.

A main fuel pump 34 receives fuel from the fuel tank 28 and serves to advance the cool fuel downstream. Drain slots 35 in the standpipe 30 will permit return of liquid fuel from the standpipe to the tank 28 so that the vapor pump 32 will not pull liquid from the standpipe.

A fuel control means 36 and bypass 37 provide for controlled flow rate under varying flight conditions.

A fuel-oil heat exchanger 38, downstream from the pump 34 and fuel control means 36, receives cool fuel from the tank 28. A hot oil conduit 39, in the fuel-oil heat exchanger 38, receives hot oil from the engine, and a cool oil conduit 40 from the fuel-oil heat exchanger 38, serves to return the cool oil to the engine. A hot fuel outlet 41 serves to communicate heated fuel to the fuel nozzles in the engine.

Suitable heat transfer means in the fuel-oil heat exchanger 38 permits sensible cooling of the hot oil by the cool fuel from the tank 28. A thermostatic sensing device 42, in the hot fuel outlet 41 of the fuel-oil heat exchanger 38, serves to selectively activate a throttle valve 43 in the standpipe 30 in the fuel tank 28, thereby permitting some of the hot fuel to be bypassed back to the tank 28, whenever a predetermined hot fuel discharge temperature is reached.

As the hot discharge fuel is throttled to tank pressure through the throttle valve 43, a partial vaporization will occur with a resulting heat absorbing effect due to the heat absorption characteristics associated with the vaporization of a volatile fuel, or liquid.

Non-vaporized fuel will be returned to the tank 28 through a plurality of slots or apertures 35 in the standpipe 30, to be cooled and recirculated.

In operation, fuel will be fed from the fuel tank 28, through the pump 34, and fuel control means 36, to the relatively cool fuel inlet of the fuel-oil heat exchanger 38. The cool fuel will sensibly cool hot oil entering the fuel-oil heat exchanger 38 through the inlet 39 until a predetermined temperature is reached in the hot fuel outlet 41. The thermostatic sensing device 42 in the hot fuel outlet 41 downstream of the fuel heat exchanger 38 will then activate a thermostatic throttle valve 43 to permit bypassing of hot fuel from the outlet conduit 41 to the fuel tank 28. The bypassing fuel is cooled as it is partially vaporized passing through the thermostatic throttle valve 43, the vapor pump removing fuel vapor through the vapor takeoff 31 in the standpipe 30, while the unvaporized liquid fuel is recirculated to the tank 28 through the slots or apertures 35 in the standpipe 30. The vapor pump can either compress the vapors sufficiently to allow them to be returned to the main fuel line 41 since the fuel nozzle pressures in the engine fuel nozzles will be low at the time of low fuel flow when vaporization is required for oil cooling, or the vapors can be sent directly to the main burner combustion chambers of the engine to be injected through separate vapor nozzles or through dual purpose fuel-vapor nozzles.

Thus, it will be appreciated that the embodiment of the present invention shown in FIGURE 2 discloses a novel type of oil cooling system for use in turbojet engines, or other types of engines requiring oil cooling, which completely eliminates the conventional air-oil heat exchanger and utilizes the heat absorbing effects associated with the vaporization of a volatile fuel, as is used in jet engines, as an additional oil cooling means to sensible cooling.

Referring now to FIGURE 3, another embodiment of the present invention is illustrated in which cool fuel is throttled before it enters a fuel-oil heat exchanger.

In FIGURE 3, a fuel tank 44 containing fuel, and a booster pump 46, acts as a reservoir and heat sink for sensibly cooling hot engine lubricating oil.

A fuel control means 47 immediately downstream of the fuel tank 44 maintains a desired fuel flow under the various operating conditions.

A thermostatically controlled throttle valve 48 downstream of the fuel control means, divides the fuel line into a high pressure and low pressure side.

A vacuum release valve 49, bypasses the throttle valve 48 whenever excessive low pressures occur downstream of the throttle valve 48 as a result of malfunction or other unusual condition.

A fuel-oil heat exchanger 50, receives hot oil from the engine through a hot oil conduit 51, and returns cool oil to the engine through a cool oil conduit 52.

A cool fuel inlet conduit 53 feeds liquid fuel to the fuel-oil heat exchanger 50, and a hot fuel outlet conduit 54 removes liquid and partially vaporized fuel from the fuel-oil heat exchanger 50.

A vapor separator pump 55 serves to separate the vaporous fuel from the liquid fuel in the hot fuel discharge conduit 54, the vapor being removed by a vapor pump 56 and fed to the engine combustion chambers by a conduit 57, while the liquid hot fuel is removed by a main fuel pump 58 and communicated by a conduit 59 to the fuel nozzles in the engine. A main fuel pump bypass valve 60 is provided to allow recirculation in the event of an over capacity pumping cycle. The pumps 55, 56 and 58, thus coact to pull a vacuum at the downstream side of the throttle valve 48.

A thermostatic sensing device 61, downstream of the fuel-oil heat exchanger 50 responds to the hot fuel outlet temperature to selectively activate the thermostatic throttle valve 48 whenever the sensible cooling through the fuel-oil heat exchanger 50 is insufficient to adequately cool the hot engine oil. Thus, as the temperature in the discharge conduit 54 tends to exceed a predetermined maximum, the thermostatic sensing device 61 causes the throttle valve 48 to partially close and reduce pressure of the fuel in the heat exchanger 50 until vaporization of the fuel absorbs additional heat of the oil. The latent heat of evaporation can absorb heat from the oil without actually raising the temperature of the fuel and vapor mixture appreciably above the predetermined maximum value set by the sensing device 61. Normally, therefore, the fuel pressure in the inlet 53 of the heat exchanger is sufficiently high so that fuel vaporization does not occur in the heat exchanger until the fuel temperature in the discharge 54 reaches the predetermined maximum value.

In operation, the pumps 55, 56 and 58, create a low pressure zone downstream of the thermostatically controlled throttle valve 48 and vacuum release valve 49. When the sensible cooling through the fuel-oil heat exchanger 50 becomes inadequate to sufficiently cool the hot engine oil, the thermostatic sensing device 61 will activate the throttle valve 48 to vaporize a sufficient quantity of fuel in the heat exchanger 50 so as to obtain additional cooling. After passing through the fuel-oil heat exchanger 50, the partially vaporized hot fuel is separated by the vapor separator pump 55 into liquid and vaporous components, the former being communicated to the engine combustion chambers by the vapor pump 56 and conduit 57, while the latter liquid fuel is communicated to the main fuel nozzles by the main fuel pump 58 and conduit 59.

It will thus be appreciated that the embodiment of the present invention shown in FIGURE 3, discloses an oil cooling system where fuel throttling of the main heat exchanger is employed, which system eliminates a second heat exchanger from the cooling cycle, with the corresponding advantages of weight reduction, simplicity of control, and reduction of the probability of oil under cooling.

The oil cooling system shown in FIGURE 3, would prove even more desirable in the event of the development of the variable speed, centrifugal fuel pump, capable of swallowing large quantities of fuel vapor, in that a great amount of recondensation would occur thereby possibly eliminating separate vapor compressors and a vapor fuel injection system.

Referring now to FIGURE 4, another embodiment of the present invention is illustrated in which two separate heat exchangers are used, one handling only liquid fuel, the other handling only vaporous fuel or mixture of vapor and fuel in certain cases.

In FIGURE 4, a fuel tank 62 containing fuel, and a booster pump 63 initially urges cool fuel through a conduit 64 to a main fuel pump 66 and fuel control means 67. A bypass conduit 68 is provided to allow recirculation of the fuel when the main fuel pump is supplying more than the engine demands.

A thermostatically controlled throttle valve 69 communicates with the fuel tank 62 upstream of the main fuel pump 66 and fuel control means 67, through a bypass conduit 70. The thermostatically controlled throttle valve 69 in turn supplies a varying quantity of vaporized fuel to a boiling cooler 71.

The boiling cooler 71 forms a first stage heat exchanger for hot engine oil and includes a hot oil inlet conduit 72, a cooled oil outlet conduit 73, and a fuel vapor outlet conduit 74. A vapor pump 76 pulls the fuel vapor through the outlet conduit 74 to remove hot vaporous fuel from the boiling cooler 71 and feeds it either in vapor or condensed form through a connecting conduit 77 to the combustion chambers in the engine, not shown.

A fuel-oil heat exchanger 78 is in communication with the fuel control means 67 downstream of the main pump 66 and fuel control means 67 and receives cool fuel from an inlet conduit 79.

The fuel-oil heat exchanger 78 is in series with the boiling cooler 71 and receives oil from the conduit 73 at its hot oil inlet. The fuel-oil heat exchanger 78 returns cool oil to the engine through a conduit 80 and delivers hot fuel to the fuel nozzles in the engine through a conduit 81.

A thermostatic sensing device 82 downstream of the secondary fuel-oil heat exchanger 78, selectively activates the thermostatic throttle valve 69 whenever a predetermined hot fuel temperature is reached in the conduit 81. Cool fuel will then pass through the bypass conduit 70 and throttle valve 69 to be vaporized and initially cool the hot oil entering the boiling cooler 71 through the hot oil inlet conduit 72.

Thus, it will be appreciated that the oil cooling system shown in FIGURE 4 discloses a novel two-stage type of cooling system in which the first stage unit is of the stand-by type, becoming selectively activated by a downstream thermo-sensing device, whenever the second stage sensible cooling unit becomes insufficient to adequately cool the oil.

It should also be appreciated that the oil cooling system shown in FIGURE 4 permits all of the vapor cooling to be handled by the first stage stand-by boiling cooler, thereby eliminating the need for a vapor separator pump, and at the same time permitting a wide range of pressures and fuel flow conditions through the boiling cooler.

In operation, cool fuel in the fuel tank 62 is initially urged through the conduit 64 by the booster pump 63. A main fuel pump 66 and fuel control means 67, then serve to maintain the flow through the fuel-oil heat exchanger 78 and hot fuel outlet conduit 81 to the engine.

Hot engine oil is initially communicated through the stand-by boiling cooler 71 to the oil conduit 73 and then to the inlet of the fuel-oil heat exchanger 78. The fuel-oil heat exchanger 78 will then initially cool the engine oil until the sensible heating of the cool fuel from the fuel tank 62 becomes inadequate to cool the hot engine oil. The thermo-sensing device 82 in the hot fuel outlet conduit 81 will then activate the bypass throttle valve 69 to permit vaporization of the cool fuel in the boiling cooler 71. Hot vaporous fuel will then be removed by the vapor pump 76 through the connecting conduit 74 and delivered to the engine combustion chambers through the conduit 77. Hot liquid fuel leaving the outlet of the fuel heat exchanger 78 is communicated to the fuel nozzles of the engine by the connecting conduit 81.

Referring now to FIGURE 5, another embodiment of the present invention is disclosed in which the fuel flow from a boiling cooler is taken from the hot fuel side of a primary fuel-oil heat exchanger.

In FIGURE 5, a fuel tank 83 containing fuel and a booster pump 84, initially delivers fuel to a main fuel pump 86 through a conduit 87. A fuel control means 88 regulates the fuel flow and a bypass conduit 89 permits recirculation in the event of over capacity pumping.

A fuel-oil heat exchanger 90 receives cool fuel from the fuel tank 83 through a conduit 85, downstream of the main fuel pump 86 and fuel control means 88. The fuel-oil heat exchanger 90 receives hot oil from a conduit 91 and returns cool oil to the engine through a conduit 92. A hot fuel conduit 93 communicates hot liquid fuel from the fuel-oil heat exchanger 90 to the combustion chambers in the engine, not shown.

A secondary boiling cooler 94 receives hot engine oil through a conduit 96 and communicates cooled oil to the inlet of the fuel-oil heat exchanger 90 through an interconnecting conduit 91. A hot fuel bypass conduit 97, downstream of the fuel-oil heat exchanger 90 communicates hot fuel to a thermostatically controlled throttle valve 98 to permit a selective vaporization of hot fuel entering the secondary boiling cooler 94.

The thermostatically controlled throttle valve 98 is actuated by a thermo-sensing device 99, downstream of the primary fuel-oil heat exchanger 90 whenever the hot fuel temperature in the conduit 93 reaches a predetermined critical value.

A vapor pump 100 removes vaporous fuel from the secondary boiling cooler 94 and communicates the hot vapors through a conduit 101 to the combustion chambers in the engine, not shown.

Thus, it will be appreciated that the embodiment of the present invention shown in FIGURE 5, utilizes the primary fuel-oil heat exchanger 90 to the greatest possible extent thereby permitting a reduction in size of the secondary boiling cooler 94.

It should also be appreciated that the oil cooling system illustrated in FIGURE 5 requires that the entire fuel flow for the engine pass through the fuel control means 88, so that any failure of the fuel bypass system 97 to the secondary boiling cooler 94 would be less likely to interfere with the engine operation. Further, since all of the fuel passes through the exchanger 90 before vaporization, undercooling of oil and overheating of fuel is minimized even during low fuel flow.

In operation, cool fuel from the fuel tank 83 is communicated through the conduit 87, the main fuel pump 86, and fuel control means 88, to the inlet of the primary fuel-oil heat exchanger 90. Hot engine oil is communicated from the engine through the conduit 96 to the secondary boiling cooler 94 where it will be initially cooled before entering the hot oil inlet of the primary fuel-oil heat exchanger 90. The hot oil entering the primary fuel-oil heat exchanger 90 will be sensibly cooled until hot fuel in the conduit 93 reaches a certain predetermined critical temperature, whereupon the thermo-sensing device 99 will cause the thermostatically controlled throttle valve 98 to open, thereby allowing hot fuel to be bypassed into the boiling chamber 94 and partially vaporized. The hot bypass fuel passing through the vaporizing throttle valve 98 produces a large cooling effect over the entire fuel side of the heat exchanger surface, thereby greatly extending the cooling range of the entire cooling system.

It will thus be apparent that in FIGURES 3 and 4, the vaporization will occur at, and beyond, the points where the extra or the vaporization heat is added to the fuel or, in the heat exchangers 50 and 71 respectively. Such vapors are separately carried to the turbo-jet or the engine by the separate and in parallel passage 57 or 77, respectively each including the vapor pump 56 or 76 respectively to thus avoid vapor clogging of the liquid fuel intake nozzles or the like. Since no heat has been added upstream of the valve 48 of FIGURE 3, or upstream of the valve 69 of FIGURE 4, normally there will not be any appreciable fuel vaporization across these two valves with rather vaporization or boiling at nearly constant pressure in the heat exchangers 50 and 71 respectively, which are downstream from these valves.

However in FIGURE 2 the extra heat has been added to the fuel upstream from valve 43 so that substantially all of the vaporization does occur as a result of the restriction or throttling action across valve 43. Here also, the vapors are separated or separably carried to the engine or turbojet by the separate and in parallel passage 31 including the vapor pump 32 to avoid clogging of the liquid fuel intake nozzles vapor. For similar reasons, it will be noted that in FIGURE 5, some vaporization occurs as a result of the throttling or pressure reducing restricting action of valve 98 since some heat has been added to the fuel by 90 upstream from this valve 98 and that the remainder of the vaporization in this case occurs at substantially constant pressure boiling in heat exchanger 94 where the extra, or rest of, the heat is added whenever the oil temperature is excessive or when the fuel flow rate is too low, thus to get the extra vaporization cooling action only when needed. In FIGURE 5 also, the vapors are separated and separately carried to the engine or turbojet by the separate and in parallel passage 101 with its fuel vapor pump 100.

Thus, in each of these four figures, the additional vaporization cooling may be obtained when needed and does not give liquid fuel nozzle clogging by the resulting vapors since they are separately supplied to the engine or turbojet through a different passage from the liquid fuel and by a vapor pump in this different passage. Thus as will be apparent, this supply of previously vaporized fuel to the engine or turbojet is also under the control of the fuel control means 32, 47, 67, and 88 of FIGURES 2, 3, 4 and 5 respectively, as pointed out hereinabove. It will also be apparent to those skilled in this art that the combined fuel supplying and other fluid cooling system for turbojets or the like of this invention may also be used to advantage for the cooling of other heated or hot vehicle working fluids in addition to, or in lieu of, the cooling of the engine lubricating oil and other such fluids are intended to be considered as included under the broader aspects of this invention.

It should be understood that various modifications and changes may be effected in the instant invention by those skilled in the art, which is herein disclosed in four specific embodiments and shown by way of preferred example only, and that such modifications or changes should be included within the novel scope of this invention and the patent warranted hereon.

We claim as our invention:

1. A fuel system which comprises a main fuel conduit having a first heat exchanger and a second heat exchanger downstream therefrom, an oil conduit communicating first with the second heat exchanger and then with the first heat exchanger in series relation, a vapor pump for evacuating the second heat exchanger, a throttle valve in the fuel conduit downstream from the first exchanger and upstream of the second exchanger to control vaporization of fuel in the second exchanger, a thermostatic sensing device in the fuel conduit between the first heat exchanger and throttle valve opening said valve to the flow of heated fuel to vaporize the same in the second heat exchanger and thereby initially cool the oil prior to passage into the first heat exchanger, and a pump for propelling fuel through the conduit and through said exchangers.

2. An oil cooling system for a turbo-jet engine and the like, comprising a fuel reservoir for containing a supply of fuel for said engine, pump means for flowing fuel from said fuel reservoir to said engine, a first liquid fuel heat exchanger between said pump means and engine receiving a flow of liquid fuel therethrough, a secondary boiling heat exchanger for selectively receiving a by-pass flow of liquid fuel from said first liquid fuel heat exchanger downstream therefrom, a throttle valve upstream of said secondary boiling heat exchanger for vaporizing the by-pass flow of fuel thereto, thermostatic sensing means downstream of said first liquid fuel heat exchanger responsive to the temperature of the fuel discharging therefrom for selectively activating said throttle valve, vapor pump means communicating with said secondary boiling heat exchanger for withdrawing and pressurizing vaporous fuel therefrom and flowing said fuel to said engine as a separate fuel source therefor, and oil conduit means in series flow relationship with said secondary boiling heat exchanger and said first liquid fuel heat exchanger for cooling and returning lubricating oil to said engine, whereby said first liquid fuel heat exchanger will maintain the temperature of the lubricating oil returned to said engine below a predetermined maximum value and said thermostatic sensing means is operable to open said throttle valve to initiate a by-pass flow of fuel therethrough and vaporize the same to thereby utilize the latent heat of vaporization of the fuel while flowing through said secondary boiling heat exchanger to effect an increased cooling of the engine lubricating oil flowing therethrough whenever the cooling capacity of the liquid fuel heat exchanger is insufficient to maintain the temperature of the engine lubricating oil below a predetermined maximum value.

3. An engine oil cooling system which comprises, a tank containing a supply of volatile fuel, a fuel-oil heat exchanger, a plurality of conduit means connecting with said heat exchanger and providing a fuel inlet connection from said tank to the heat exchanger and a fuel outlet connection for substantially liquid fuel from said heat exchanger to the engine, and oil inlet and outlet connections directing heated and cooled engine oil to and from the heat exchanger, thermostatic sensing means in the fuel outlet connection between the heat exchanger and engine, a second heat exchanger having an inlet from said conduit means between said tank and said engine, passage means directing oil from the engine to the second heat exchanger and initially cooled oil therefrom to the first heat exchanger, and thermostatic pressure reducing valve means operated by the sensing means and located at the inlet of the second heat exchanger to help to vaporize fuel therein and initially reduce the temperature of oil passing therethrough to the first heat exchanger by heat transfer to the vaporized fuel in said second heat exchanger, said second heat exchanger having an outlet connection to separately supply previously vaporized fuel to said engine.

4. A liquid cooling system combined with an engine fuel feed system which comprises, a tank containing a supply of volatile fuel, a liquid to fuel heat exchanger, a plurality of conduit means connecting with said heat exchanger and providing a fuel inlet connection from said tank to the heat exchanger and a fuel outlet connection from said heat exchanger to the engine, and liquid inlet and outlet connections directing heated and cooled liquid to and from the heat exchanger, thermostatic sensing means in the fuel outlet connection between the heat exchanger and engine, said fuel outlet connection being adapted to carry only substantially liquid fuel, a second heat exchanger, having an inlet connected to receive substantially liquid fuel from said conduit means, passage means directing liquid from the engine to the second heat exchanger and initially cooled liquid therefrom to the first heat exchanger, thermostatic throttle valve means connecting with the sensing means to be operated thereby and located at the inlet of liquid fuel for said second heat exchanger to vaporize and remove heat from fuel therein and initially reduce the temperature of oil passing therethrough to the first heat exchanger by heat transfer to the vaporized fuel in said second heat exchanger, and vapor pump means connecting with the second heat exchanger receiving the product of fuel vaporization and having a second fuel outlet connection to direct the same to the engine.

5. For use with an aircraft turbojet engine of the type having an engine lubricating oil cooling system comprising means including connecting passages to recirculate said oil through said engine and through an oil-to-fuel, oil cooling heat exchanger combined with an engine fuel supplying system including a tank for a volatile liquid fuel, said oil-to-fuel heat exchanger to sensibly heat the liquid fuel flowing therethrough, engine feeding pump means also producing regions of higher and lower pressures in said fuel system, a fuel supply regulating control to set the desired rate of flow of substantially all fuel and the resulting power output of the engine, and interconnected conduits and fuel inlet nozzle means to supply the fuel to said engine; an aerodynamic drag reducing and power plant weight saving improvement and attachment to provide, only when needed, an additional oil cooling and heat removal by the latent of vaporization of at least part of the fuel and the supplying of such part of the fuel to such an engine without harmful interference with the engine's power regulation, said attachment comprising, a temperature sensing means to be connected to be responsive to the temperature of the sensibly heated liquid fuel downstream of such a heat exchanger of such a fuel supplying system, a pressure reducing and vaporization aiding, variable valve means substantially independent of the fuel regulating control of such an engine and connected to be responsive to said sensing means and to be connected in such a fuel supplying system between a higher pressure region and a lower pressure region thereof, to aid in the vaporization of fuel by providing a lower pressure, a vaporization region downstream from said variable valve means in such a fuel supplying system, means including an additional passage to carry fuel vapor, to be connected into such systems in operative relation to said vaporization region and downstream from said variable valve means to supply the latent heat of fuel vaporized therein from said recirculating lubricating oil, an additional, pressure difference producing, and vapor removing pump to be connected in such a fuel supplying system to coact with, and downstream of, said variable valve means and a separate discharge to be connected downstream of said vapor removing pump to separately supply the previously vaporized fuel therefrom into such an engine without vapor clogging of the engine's liquid fuel inlet nozzle means.

6. In a combined fuel supplying and liquid cooling system for an engine, in combination; supply means adapted to be connected to an engine to supply and to pump fuel thereto, said supply means including a first means to transfer heat from said liquid to cool it and sensibly heat, and to raise the temperature of, liquid fuel and to supply it to such an engine, said supply means also including a second and thermostatically actuated liquid cooling means responsive to, and limiting, the temperature of said sensibly heated liquid fuel by vaporizing liquid fuel only when necessary to thereby additionally cool said liquid by the loss of the latent heat of vaporization of said fuel, said supply means further including a valve means connected to selectively control the engine power setting by variably regulating the total supply of liquid and vapor fuel thereto substantially independently of the actions of said first and second liquid cooling means and means connected to supply said liquid fuel and to supply said previously vaporized fuel to said engine.

7. In a combined fuel supplying and liquid cooling system for an engine, in combination; supply means adapted to be connected to an engine to supply and to pump fuel thereto, said supply means including a first means to transfer heat from said liquid to cool it and sensibly heat, and to raise the temperature of, liquid fuel and to supply it to such an engine by a first passage to be connected thereto, said supply means also including a second and thermostatically actuated liquid cooling means responsive to, and limiting, the temperature of said sensibly heated liquid fuel by vaporizing liquid fuel only when necessary to thereby additionally cool said liquid by the transfer of the latent heat of vaporization of said fuel, said second cooling means including a second and outlet passage including a vapor pump and adapted to be connected to supply substantially only previously vaporized fuel to said engine, and said supply means further including valve means connected to selectively control the engine power setting by variably regulating the total supply of both liquid and vapor fuel thereto substantially independently of the actions of said first and second cooling means.

8. In a combined fuel supplying and lubricating oil cooling system for a turbojet engine, in combination; fuel supplying means adapted to be connected to an engine to supply, pump, and regulate the engine's power and its total fuel supply and including as parts thereof, a first means transferring heat from said oil to sensibly heat, and to raise the temperature of, liquid fuel to cool said oil and supplying fuel to such an engine and a second means supplying fuel to such an engine and including a vaporization controlling means responsive to the temperature of said sensibly heated liquid fuel to aid in the vaporization of fuel being supplied and pumped to such an engine by said supplying means to additionally cool said circulated oil by the removal therefrom of the latent heat of said fuel vaporization, said second means including a separate passage to supply said previously vaporized fuel to said engine.

9. In a combined fuel supplying and liquid cooling system for a turbojet engine, in combination; fuel supplying means adapted to be connected to the turbojet engine to supply, pump, and regulate the engine's power and its total fuel supply and including as parts thereof a first means supplying fuel and transferring heat from said liquid to sensibly heat, and to raise the temperature of, liquid fuel being supplied to such an engine to cool said liquid and a second means supplying fuel and including a fuel vaporization controlling and remotely thermostatically actuated valve connected to be responsive to, and limiting, the temperature of said sensibly heated liquid fuel to vaporize fuel being supplied to such an engine by said supplying means to additionally cool said liquid by the removal therefrom of the latent heat of said fuel vaporization, said first means also comprising means including a first passage to be operatively connected to such an engine to supply substantially only sensibly heated liquid fuel thereto from said first means, said second means including a second separate passage to be connected to such an engine from said second means to supply substantially only previously vaporized fuel to said turbojet engine.

10. In a combined fuel supplying and liquid cooling system for an engine; in combination, fuel supplying means adapted to be connected to such an engine to supply and pump and to selectively meter the engine's total supply of volatile fuel at predetermined rates including, as parts thereof, a first means to supply liquid fuel to such an engine and to cool a liquid including a first heat exchanger transferring heat from said liquid to always sensibly heat liquid fuel being supplied to such an engine and a second means supplying fuel and cooling said same liquid by transferring heat therefrom to at least a part of the fuel being supplied to such an engine for vaporization thereof and including a second heat exchanger having its inlet connected upstream of said first heat exchanger, said second means having variable pressure reducing means upstream from said second heat exchanger to control such vaporization substantially independently of said fuel metering rates, outlet means connected to said second means and its said second heat exchanger to supply substantially only previously vaporized fuel to said engine including a vapor removing pump and means including a separate passage adapted to be connected to said engine to supply substantially only liquid fuel thereto from said first means and its first heat exchanger means.

11. A combined system for engine fuel feed and for the cooling of another fluid comprising first means to supply and meter substantially liquid and heated volatile fuel to an engine and to cool said fluid by sensible heating of said fuel including a fuel tank, a fuel pump, engine fuel supply control means, heat exchanger means and interconnecting passages with an outlet to supply substantially liquid and sensibly heated fuel to such an engine and second means to help to supply fuel and to cause the vaporization of at least part of the fuel from said first means to cool said fluid, at least part of said heat exchanger means being connected to supply the latent heat of vaporization for said vaporization of said second means, said second means including fuel temperature responsive means in said first means downstream from said heat exchanger means, a vaporization aiding and fuel pressure reducing valve controlled by said fuel temperature responsive means connected to reduce the pressure of, and help vaporize, at least part of the fuel from a point in said first means and a second passage means connected in parallel to said first means and having a vapor removal pump therein and an outlet portion to be connected to supply previously vaporized fuel to such an engine.

12. In a combined fuel supplying and liquid cooling system for an engine; in combination, first means adapted to be connected to such an engine to supply, pump and selectively meter the engine's supply of heated liquid volatile fuel at predetermined rates and to cool a liquid by sensibly heating said fuel being supplied to such an engine by heat exchange relation with the liquid, said first means including a fuel tank for volatile liquid fuel, a fuel pump and a liquid to fuel heat exchanger and second means to separately supply to such an engine and to cause the vaporization of at least part of said fuel being supplied by said first means by heat exchange relation with the liquid, said second means additionally and at least indirectly cooling the liquid and including variable means to control such vaporization with little effect on said fuel metering rates, said second means also including passage means in said fuel tank in heat exchange relation between the fuel in said tank and said vaporized fuel and vapor removal means comprising a vapor pump connected into said first means downstream of said heat exchanger and downstream of said variable means and said means in said tank with a separate outlet passage to supply such previously vaporized fuel to such an engine.

13. In a combined fuel supplying and engine lubricating oil cooling system for a turbojet engine or the like, in combination, first means adapted to be connected to such an engine to supply, pump and selectively meter the engine's supply of heated liquid volatile fuel at predetermined rates and to cool the lubricating oil of such an engine by sensibly heating said fuel being supplied to such an engine by heat exchange relation with the oil, said first means including a fuel tank for volatile liquid fuel, a fuel pump, and an oil to fuel heat exchanger and second means to separately supply to such an engine and to cause the vaporization of at least part of said fuel being supplied to such an engine by said first means by heat exchange relation with the oil to at least indirectly cool the oil, said same heat exchanger of said first means adding heat for vaporization in said second means, said second means including means responsive to the temperature of the fuel emerging from said heat exchanger, variable means to control such vaporization with little effect on said fuel metering rates comprising a restricting and vaporizing valve controlled by said temperature responsive means and said second means including a passage through a standpipe means in, and draining into, said fuel tank and in heat exchange relation with the fuel therein, vapor removal means comprising a vapor pump downstream of said standpipe means and a separate outlet passage from said vapor pump to such an engine.

14. In a combined fuel supplying and liquid cooling system for a turbojet engine or the like, in combination, first means adapted to be connected to such an engine to supply, pump and selectively meter the engine's supply of heated liquid volatile fuel at predetermined rates and to cool the lubricating oil of such an engine by sensibly heating said fuel being supplied to such an engine by heat exchange relation with the oil, said first means including a fuel tank for volatile liquid fuel, a booster pump to deliver fuel from said tank, a fuel flow control means connected to control the flow of fuel from said booster pump to vary fuel supply and regulate the power setting of such an engine, and a heat exchanger and second means to separately supply to such an engine and to cause the vaporization of at least part of said fuel being supplied to such an engine by said first means by heat exchange relation with the oil to at least indirectly cool the liquid, said second means including means responsive to the temperature of the fuel being discharged from said heat exchanger, variable means to control such vaporization with little effect on said fuel metering rates comprising a restricting and vaporizing valve controlled by said temperature responsive means and said second means including a vapor separating pump connected to receive fuel from the fuel outlet of said heat exchanger and said first means including a liquid fuel pump connected to receive liquid fuel from said separating pump and a separate outlet from said fuel pump to be connected to supply liquid fuel to such an engine, vapor removal means comprising a vapor pump connected to receive fuel vapors from said separating pump and an outlet passage from said vapor pump to such an engine.

15. In a combined fuel supplying and engine lubricating oil cooling system for a turbojet engine or the like, in combination, first means adapted to be connected to such an engine to supply, pump and selectively meter the engine's supp'y of heated liquid volatile fuel at predetermined rates and to cool the lubricating oil of such an engine by sensibly heating said fuel being supplied to such an engine by heat exchange relation with the oil, said first means including a fuel tank for volatile liquid fuel, an oil to fuel heat exchanger and a restricting and vaporizing valve connected between said heat exchanger and said fuel tank and second means to separately supply to such an engine and to cause the vaporization of at least part of said fuel being supplied to such an engine by said first means by heat exchange relation with the oil to at least indirectly cool the oil, said same heat exchanger of said first means adding heat for vaporization in said second means, said second means including variable means to control such vaporization with little effect on said fuel metering rates, means connected downstream from said heat exchanger for separating liquid fuel from its vapors and vapor pump means connected to receive vapors from said separating means and with a separate outlet passage to such an engine and pump means connected to receive liquid fuel from said separating means to pump it to such an engine.

16. A combined fuel supplying and liquid cooling system for turbojet engines or the like, said system comprising; in combination, a fuel supplying means adapted to be connected to such an engine to supply, pump, and to selectively meter the engine's total fuel supply of volatile fuel at predetermined rates including a fuel tank, a booster pump receiving fuel therefrom, a positive displacement pump receiving fuel from said booster pump and heat exchanger means and also including as parts thereof, a first means to supply liquid fuel to such an engine and to cool a liquid by sensibly heating said fuel being supplied by heat exchange relation with the liquid and a second means to supply previously vaporized fuel to such an engine and to additionally and at least indirectly cool the liquid by vaporizing at least part of the fuel being supplied to such an engine by heat exchange relation with the liquid, said first and second means each operatively including at least part of said heat exchanger means by each including a separate heat exchanger to transfer heat from said liquid to said fuel, said first heat exchanger of said first means receiving fuel from said positive displacement pump and said second means having its separate and second heat exchanger connected to receive fuel from said booster pump ahead of said positive displacement pump and including a variable and pressure reducing valve to control such vaporization with little effect on said fuel metering rates and located between said second heat exchanger of said second means and said booster pump, said second means also including a vapor removal pump downstream of said second heat exchanger and a separate passage to supply fuel to such an engine from said vapor removal pump.

17. In a combined fuel supplying and liquid cooling system for an engine; in combination, first means to supply heated liquid fuel to such an engine and to cool a liquid by sensibly heating such fuel being supplied by heat exchange relation with the liquid, second means to supply previously vaporized fuel to such an engine and to at least indirect'y cool the liquid by vaporizing at least part of said fuel being supplied by heat exchange relation with the liquid, said second means including variable means to control such vaporization and vapor removal means having a separate outlet passage to said engine, and common means to supply, pump, and meter at selected predetermined rates, but little affected by said variable vaporization means, such fuel being heated and supplied to such an engine by said first and second means.

18. In an engine lubricating oil cooling system, in combination; fuel supplying means including a fuel tank for liquid volatile fuel and two passageways adapted to be connected to separately feed liquid fuel and vaporized fuel to such an engine, said fuel supplying means including means to variably substantially control the fuel supply and the resulting power output of such an engine, oil to fuel heat exchanger means connected in said fuel supplying means, at least part of said heat exchanger means providing means to always cool said oil by the sensible heating of liquid fuel to such an engine through a first one of said passageways and means to additionally cool said oil only when needed by the vaporization of said fuel and to separately supply such fuel vapors to such an engine comprising thermostatic sensing means responsive to the fuel temperature between said sensible heating part of said heat exchanger means and said engine, a restricting and vaporization aiding valve means connected to be operated by said sensing means at a predetermined fuel temperature and located in said fuel supplying means to help in vaporizing at least part of said fuel in a region downstream therefrom in said fuel supplying means, at least part of said heat exchanger means acting to additionally and at least indirectly cool said oil only when the fuel at said sensing means is above said predetermined fuel temperature and add the latent heat of vaporization to at least part of said fuel being supplied to such an engine, vapor pump means connected to receive fuel vapors from said vaporizing region and supply them to said engine through a second one of said passageways.

19. In a combined fuel supplying and liquid cooling system for an engine; in combination, first means adapted to be connected to such an engine to supply, pump and selectively meter the engine's supply of heated liquid volatile fuel at predetermined rates and to cool a liquid by sensibly heating said fuel being supplied to such an engine by heat exchange relation with the liquid and second means to separately supply to such an engine, and to cause the vaporization of at least part of, said fuel being supplied by said first means by heat exchange relation with the liquid to at least indirectly cool the liquid, said second means including variable means to control such vaporization with little effect on said fuel metering rates, said second means also including vapor removal means with a separate outlet passage to supply such previously vaporized fuel to such an engine.

References Cited in the file of this patent
UNITED STATES PATENTS

| 1,199,237 | Hobbs | Apr. 30, 1935 |
| 2,316,376 | Weiss | Apr. 13, 1943 |
| 2,602,289 | Anxionnaz et al. | July 8, 1952 |
| 2,675,671 | Malgieri | Apr. 20, 1954 |
| 2,809,810 | Carroll et al. | Oct. 15, 1957 |

FOREIGN PATENTS

| 1,110,604 | France | Oct. 12, 1955 |
| 1,111,177 | France | Oct. 26, 1955 |